United States Patent
Umbach et al.

(10) Patent No.: US 12,522,306 B2
(45) Date of Patent: Jan. 13, 2026

(54) IDLER FOR MACHINES

(71) Applicant: Caterpillar Inc., Peoria, IL (US)

(72) Inventors: Brian B. Umbach, Peoria, IL (US); Martin Tagore Joseph Xavier, Chennai (IN); Seiji Iijima, Hyogo-ken (JP)

(73) Assignee: Caterpillar Inc., Peoria, IL (US)

(*) Notice: Subject to any disclaimer, the term of this patent is extended or adjusted under 35 U.S.C. 154(b) by 349 days.

(21) Appl. No.: 18/195,011

(22) Filed: May 9, 2023

(65) Prior Publication Data
US 2024/0375732 A1    Nov. 14, 2024

(51) Int. Cl.
*B62D 55/14* (2006.01)

(52) U.S. Cl.
CPC ................. *B62D 55/14* (2013.01)

(58) Field of Classification Search
CPC ............... B62D 55/14; B62D 55/145
See application file for complete search history.

(56) References Cited

U.S. PATENT DOCUMENTS

| | | | |
|---|---|---|---|
| 5,022,718 A * | 6/1991 | Diekevers | B62D 55/14 305/136 |
| 5,190,363 A | 3/1993 | Brittain et al. | |
| 7,823,990 B2 * | 11/2010 | Angot | B62D 55/20 305/195 |
| D647,118 S | 10/2011 | Parker et al. | |
| 8,075,069 B2 | 12/2011 | Pech et al. | |
| 2018/0057082 A1 * | 3/2018 | Johannsen | B62D 55/14 |
| 2019/0118880 A1 | 4/2019 | Tutschek et al. | |
| 2019/0144056 A1 * | 5/2019 | Johannsen | B62D 55/14 305/199 |
| 2021/0129927 A1 | 5/2021 | Lussier et al. | |
| 2021/0179210 A1 | 6/2021 | Hakes | |

FOREIGN PATENT DOCUMENTS

CN    210707677    6/2020

* cited by examiner

*Primary Examiner* — Kip T Kotter

(57) ABSTRACT

An idler and method of manufacturing is disclosed. The idler may comprise a web member, a rim and a plurality of flanges. The web member may include a body. The body may include a front side, a back side and an aperture extending therethrough, wherein the web member is centered about the aperture and has an outer circumference. The rim may be oriented transverse to the web member and disposed on the outer circumference. The plurality of flanges may be spaced apart in a zig-zag disposition on the rim, each flange projecting radially outward from the rim and oriented to extend longitudinally parallel to the outer rim circumference.

9 Claims, 5 Drawing Sheets

IDLER FOR MACHINES

TECHNICAL FIELD

The present disclosure generally relates to idlers for track machines, and more particularly, for hydraulic excavators.

BACKGROUND

Cast idlers are primarily used for heavy duty applications because of the weight of the cast idlers, and because of the cost of such cast idlers. Typically fabricated idlers have been used on machines where weight is a concern and/or component cost.

U.S. Pat. No. 5,190,363, issued May 2, 1993, discloses a drive wheel for a belted track crawler having circumferentially spaced frictional engagement elements. While beneficial for removing mud and debris from the track wheel interface, a better wheel is desired.

SUMMARY OF THE DISCLOSURE

In one aspect of the present disclosure, an idler is disclosed. The idler may comprise a web member, a rim and a plurality of flanges. The web member may include a body. The body may include a front side, a back side and an aperture extending therethrough, wherein the web member is centered about the aperture and has an outer circumference. The rim may be oriented transverse to the web member and disposed on the outer circumference. The plurality of flanges may be spaced apart in a zig-zag disposition on the rim, each flange projecting radially outward from the rim and oriented to extend longitudinally parallel to the circumference.

In another aspect of the disclosure, a method of manufacturing an idler is disclosed. The method may comprise casting the idler, wherein the idler comprises a web member, a rim and a plurality of flanges. The web member may include a body that includes a front side, a back side and an aperture extending therethrough, wherein the web member is centered about the aperture and has an outer circumference. The rim may be oriented transverse to the web member and disposed on the outer circumference. The plurality of flanges may be spaced apart in a zig-zag disposition on the rim, each flange projecting radially outward from the rim and oriented to extend longitudinally parallel to the circumference.

In yet another aspect of the disclosure, an idler is disclosed. The idler may comprise a web member, a rim and a plurality of flanges. The web member may include a body, the body including a front side, a back side and an aperture extending therethrough, wherein the web member is centered about the aperture and has an outer circumference. The rim may be oriented transverse to the web member and disposed on the outer circumference. The plurality of flanges may be spaced apart in a zig-zag disposition on the rim, each flange projecting radially outward from the rim and oriented to extend longitudinally parallel to the circumference, wherein one or more flanges have a top disposed between a first side and a second side, wherein one or more flanges have a first ratio of a width of the top of the flange to a flange height in the range of 0.6-0.8, wherein one or more flanges have a second ratio of a width of the base of the flange to a flange height in the range of 0.8-1.1, wherein one or more flanges have a third ratio of a width of the top of the flange to a width of the base of the flange in the range of 0.3-0.45.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts, unless otherwise specified.

Figure 1:
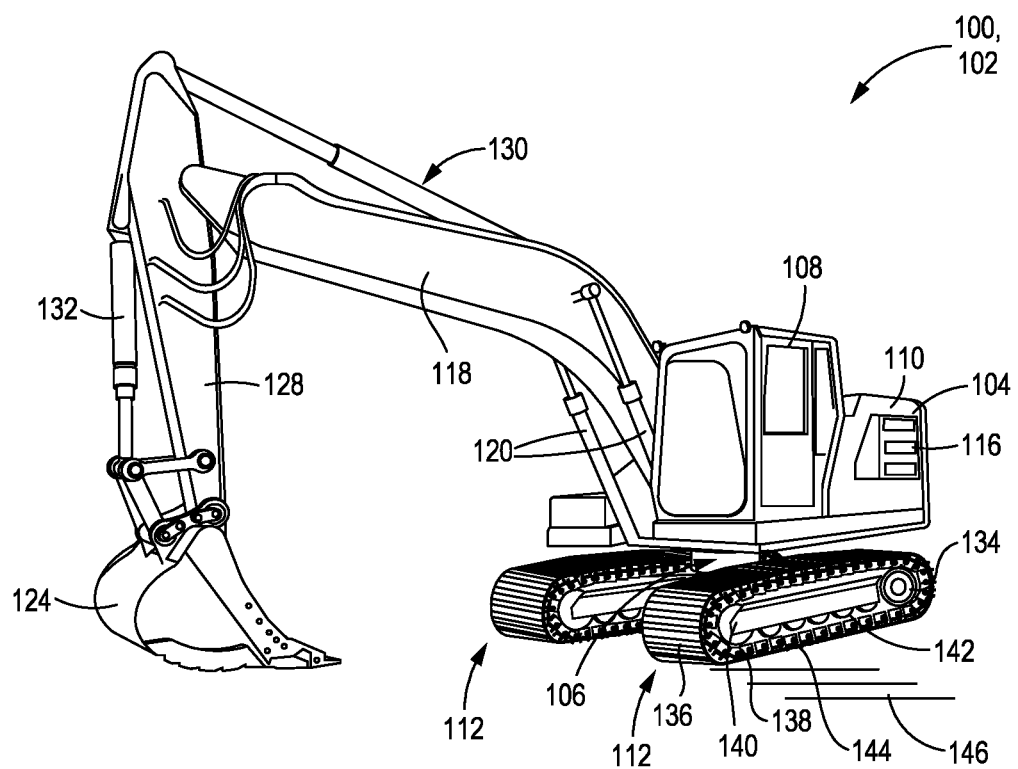
FIG. 1 is a perspective view of an exemplary machine that may include the system according to the present disclosure.

FIG. 1 illustrates one example of a machine 100 that may incorporate the features of the present disclosure. The exemplary machine 100 may be a vehicle such as an excavator 102. While the following detailed description and drawings are made with reference to an excavator 102 as the exemplary machine 100, the teachings of this disclosure may be employed on other machines 100.

The excavator 102 may include an upper frame 104 rotationally connected to a lower frame 106. The upper frame 104 rotates/pivots in both the clockwise and the counterclockwise direction. The upper frame 104 includes an operator station 108 and a machine body 110. The lower frame 106 includes one or more track assemblies 112. One of ordinary skill in the art will appreciate that the machine 100 further includes a power source 116 (for example an engine), and a hydraulic system. The hydraulic system may be powered by the power source 116.

The excavator 102 further includes a boom 118 pivotably mounted on the machine body 110, a stick 128 pivotally connected to the boom 118 and a bucket 124 pivotally coupled to the stick 128. In other embodiments the bucket 124 may be replace with another tool.

The operator station 108 may be configured to house control levers, joysticks, push buttons, and other types of control elements typically known in the art for actuating an operation of the excavator 102, the track assemblies 112, the boom 118, stick 128 and the bucket 124.

The hydraulic system may include boom hydraulic cylinders 120, a stick hydraulic cylinder 130, and a bucket hydraulic cylinder 132. The boom hydraulic cylinders 120 are each coupled to the boom 118 and configured to actuate movement (raising/lowering) of the boom 118 relative to the machine body 110. The stick hydraulic cylinder 130 is coupled to the stick 128 and configured to actuate (pivoting inward/outward) movement of the stick 128 about the boom 118. The bucket hydraulic cylinder 132 is coupled to the bucket 124 and configured to actuate (pivoting) movement of the bucket 124 from a curl position to a dump position and vice versa.

Each track assembly 112 may include one or more track driving members 134, a ground engaging track 136, link assemblies 138, one or more idlers 140, and one or more mid-rollers 142. The ground engaging tracks 136 include a plurality of track shoes 144. In an embodiment, each track shoe 144 may be coupled to a link assembly 138. The track driving members 134 are configured to transmit torque from a powertrain (not shown) to ground engaging tracks 136 to cause translation of the excavator 102 on the work surface 146.

Figure 2:
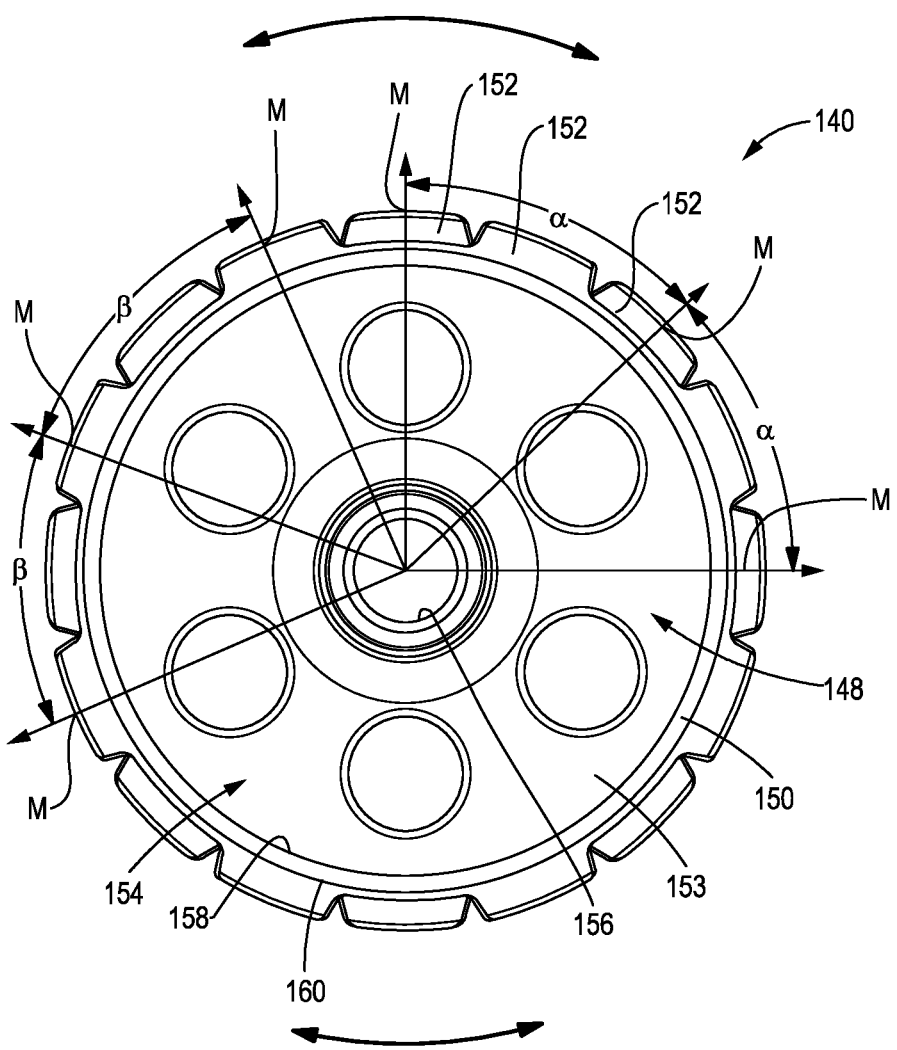
FIG. 2 is a front view of an idler.

Turning now to FIG. 2, an exemplary idler 140 is shown. The idler 140 comprises a web member 148, a rim 150 and a plurality of flanges 152. In an embodiment, the idler 140 may be cast metal (e.g., iron) and is configured to rotate about a wheel stub (not shown) or the like of a track assembly 112 (FIG. 1).

The web member 148 (FIG. 2) includes a body 154. The body 154 includes a front side 153, a back side 155 and a center aperture 156 extending therethrough. The web member 148 is centered about the center aperture 156 and has an outer circumference 158. In an embodiment, the body 154 may be single-walled between the front side 153 and the back side 155. The center aperture 156 is configured to receive the wheel stub (or the like) of the track assembly 112 (FIG. 1).

Figure 5:
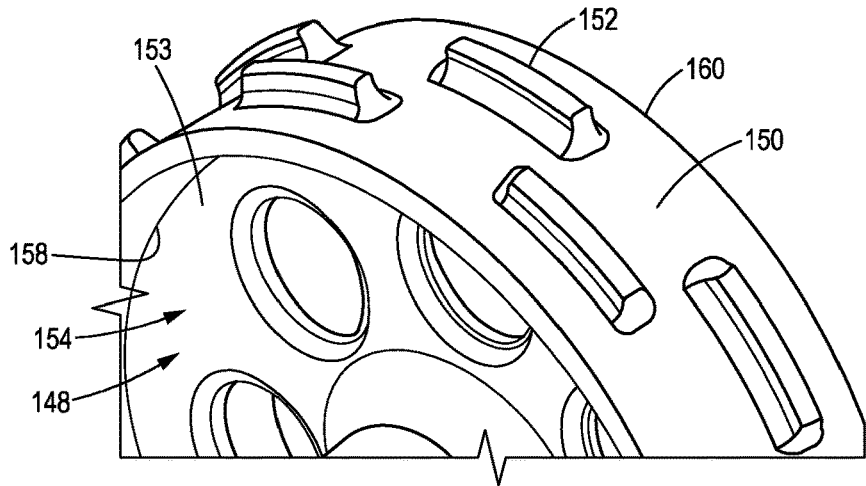
FIG. 5 is perspective view of the front side of the idler of FIG. 2.
Figure 6:
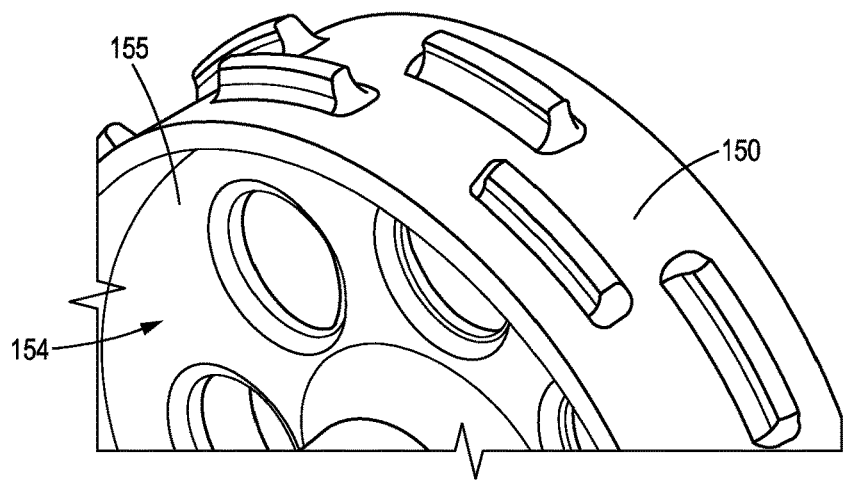
FIG. 6 is perspective view of the back side of the idler of FIG. 2.

The rim 150 (FIG. 5) is oriented transverse to the web member 148 and is disposed on the outer circumference 158 of the web member 148. In an embodiment, the rim 150 extends outward from the front side 153 (see FIG. 5) and outward from the back side 155 (see FIG. 6) of the body 154. The rim 150 has an outer rim circumference 160.

Figure 3:
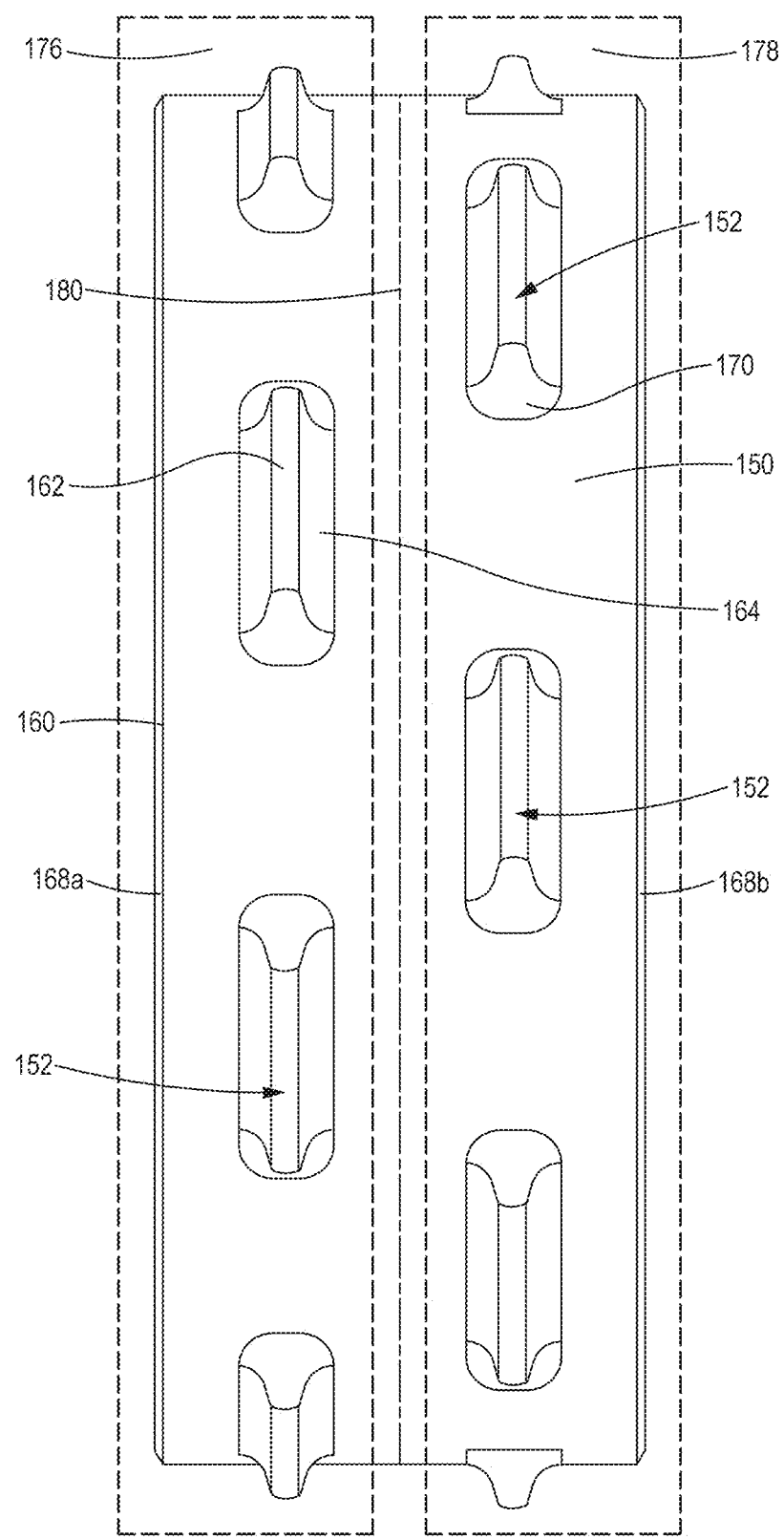
FIG. 3 is a side view of the idler of FIG. 2

As shown in FIG. 3, the plurality of flanges 152 are spaced apart in a zig-zag disposition on the rim 150. One or more flanges 152 project radially outward from the rim 150 and are oriented to extend longitudinally parallel to the outer rim circumference 160.

Figure 4:
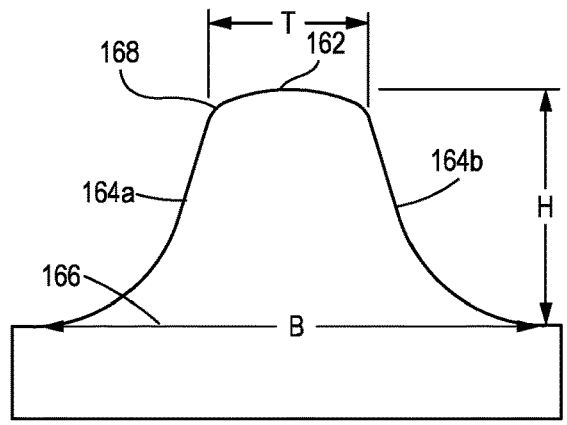
FIG. 4 is a cross-sectional view of a flange of the idler of FIG. 2.

As shown in FIG. 4, one or more of the flanges 152 include a top 162, a first side 164a, a second side 164b and a base 166. The top 162 is disposed between the first side 164a and the second side 164b. The first side 164a may be sloped and the second side 164b may be sloped. In an embodiment, slope of the first side 164a may be a concave slope and the slope of the second side 164b may be a concave slope. The top 162 may be have rounded edges 168 at the intersection with the concave sloping first and second sides 164 (a,b). In an embodiment, one or more flanges 152 may have: a first ratio of a width T (FIG. 4) of the top 162 of the flange 152 to a flange height H in the range of 0.6-0.8; a second ratio of a width B of the base 166 of the flange 152 to a flange height H in the range of 0.8-1.1; and a third ratio of a width T of the top 162 of the flange 152 to a width B of the base 166 of the flange 152 in the range of 0.3-0.45.

As seen in FIG. 2, in an embodiment, a first portion 176 of the plurality of flanges 152 is disposed proximal to a first edge 168a of the rim 150 and a second portion 178 of the plurality of flanges 152 is disposed proximal to a second edge 168b of the rim 150. As shown in FIG. 2, in an embodiment, a mid-point M of each of the first portion 176 of flanges 152 is disposed at an angle $\beta$ apart on a first (outer) rim circumference 160, wherein a mid-point M of each of the second portion of flanges 152 is disposed at an angle $\alpha$ apart on a second (outer) rim circumference 160. The vertex of angle $\beta$ is on the center of the center aperture 156. The vertex of angle $\alpha$ is on the center of the center aperture 156. In one embodiment, the angle $\beta$ may be about 45°. In one embodiment, the angle $\alpha$ may be about 45°. In other embodiments, angle $\beta$ may be other values and angle $\alpha$ may be other values. For example in an embodiment angle $\beta$ may be in the range of 40°-50° or 44°-46°, and angle $\alpha$ may be in the range of 40°-50° or 44°-46°.

As seen in FIG. 2, In an embodiment, a first portion 176 of the plurality of flanges 152 is disposed proximal to a first edge 168a of the rim 150 and a second portion 178 of the plurality of flanges 152 is disposed proximal to a second edge 168b of the rim 150. As shown in FIG. 2, in an embodiment, a mid-point M of each of the first portion 176 of flanges 152 is disposed at an angle $\beta$ apart on a first (outer) rim circumference 160, wherein a mid-point M of each of the second portion of flanges 152 is disposed at an angle $\alpha$ apart on a second (outer) rim circumference 160. The vertex of angle $\beta$ is on the center of the center aperture 156. The vertex of angle $\alpha$ is on the center of the center aperture 156. In one embodiment, the angle $\beta$ may be about 45°. In one embodiment, the angle $\alpha$ may be about 45°. In other embodiments, angle $\beta$ may be other values and angle $\alpha$ may be other values. For example in an embodiment angle $\beta$ may be in the range of 40°-50° or 44°-46°, and angle $\alpha$ may be in the range of 40°-50° or 44°-46°.

As can be seen in FIG. 3, in an embodiment, a center circumference 180 of the rim 150 may be free of the plurality of flanges 152.

Each of the flanges 152 extend longitudinally on the rim 150 in a direction of rotation of the idler 140. The flanges 152 of the first portion 176 may alternate with the flanges 152 of the second portion 178. The flanges 152 may form an elongated strip shape. As shown in FIG. 3, in an embodiment, the ends 170 of the flanges 152 may be generally flat or sloped. The sloped sides 164 of the flange 152 may be curved. In an embodiment the curve may be a concave curve resulting in concave sloping first and second sides 164 (a,b).

Figure 7:
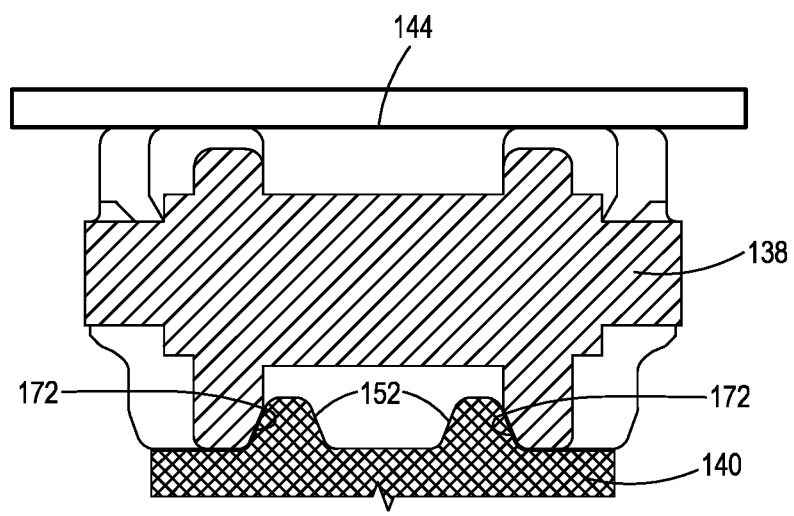
FIG. 7 is a perspective view of the interface between an exemplary flange and a link assembly.

The idler 140 is configured to engage a link assembly 138 (FIG. 7). More specifically, each of the plurality of flanges 152 is configured to frictionally engage an inner surface 172 of a link assembly 138 coupled to a track shoe 144.

Also disclosed is a method for manufacturing the idler 140 disclosed herein. The method comprises casting the idler 140. In an embodiment, the idler 140 is an integral one piece. In an embodiment the idler 140 is metal. In a refinement, the idler 140 may be cast metal. For example, the front side 153 and the back side 155 of the web member 148 may be separated by only the metal of the web member 148.

INDUSTRIAL APPLICABILITY

In general, the foregoing disclosure finds utility in machines 100 having idlers 140. The teachings of this disclosure enable use of a cast idler 140, instead of fabricated idlers, in applications where weight of the machine is a concern or cost is a concern. The disclosure herein provide for a cast idler that has reduced weight while still providing resiliency of a cast component.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. An idler comprising:
    a web member including a body, the body including a front side, a back side and an aperture extending therethrough, wherein the web member is centered about the aperture and has an outer circumference;
    a rim oriented transverse to the web member and disposed on the outer circumference; and
    a plurality of flanges spaced apart in a zig-zag disposition on the rim, each flange projecting radially outward from the rim and oriented to extend longitudinally parallel to the outer circumference,
wherein one or more flanges have a top disposed between a first side and a second side,
wherein one or more flanges have a first ratio of a width of the top of the flange to a flange height in the range of 0.6-0.8,
wherein one or more flanges have a second ratio of a width of a base of the flange to the flange height in the range of 0.8-1.1,
wherein one or more flanges have a third ratio of the width of the top of the flange to the width of the base of the flange in the range of 0.3-0.45.

2. The idler of claim 1, wherein a first portion of the plurality of flanges is disposed proximal to a first edge of the rim and a second portion of the plurality of flanges is disposed proximal to a second edge of the rim.

3. The idler of claim 1, wherein the body is single-walled and the idler is cast iron.

4. The idler of claim 1, wherein a center circumference of the rim is free of the plurality of flanges.

5. A method of manufacturing an idler, the method comprising:
casting the idler, wherein the idler comprises:
a web member including a body, the body including a front side, a back side and an aperture extending therethrough, wherein the web member is centered about the aperture and has an outer circumference;
a rim oriented transverse to the web member and disposed on the outer circumference;
a plurality of flanges spaced apart in a zig-zag disposition on the rim, each flange projecting radially outward from the rim and oriented to extend longitudinally parallel to the outer circumference,
wherein one or more flanges have a first ratio of a width of a top of the flange to a flange height in a range of 0.6-0.8;
wherein one or more flanges have a second ratio of a width of a base of the flange to a flange height in a range of 0.8-1.1; and
wherein one or more flanges have a third ratio of the width of the top of the flange to the width of a base of the flange in a range of 0.3-0.45.

6. The method of claim 5, wherein the idler is metal.

7. The method of claim 5, wherein the body is single-walled.

8. The method of claim 5, wherein one or more flanges have a top disposed between a first side and a second side.

9. The method of claim 5, wherein a center circumference of the rim is free of the plurality of flanges.

* * * * *